Dec. 6, 1966 D. J. LENNARD 3,289,946
ANNULAR CONVERGENT-DIVERGENT EXHAUST NOZZLE
Filed Aug. 7, 1963 3 Sheets-Sheet 1

INVENTOR.
DEAN J. LENNARD
BY
Harry C. Burgess
ATTORNEY

Dec. 6, 1966 D. J. LENNARD 3,289,946
ANNULAR CONVERGENT-DIVERGENT EXHAUST NOZZLE
Filed Aug. 7, 1963 3 Sheets-Sheet 2
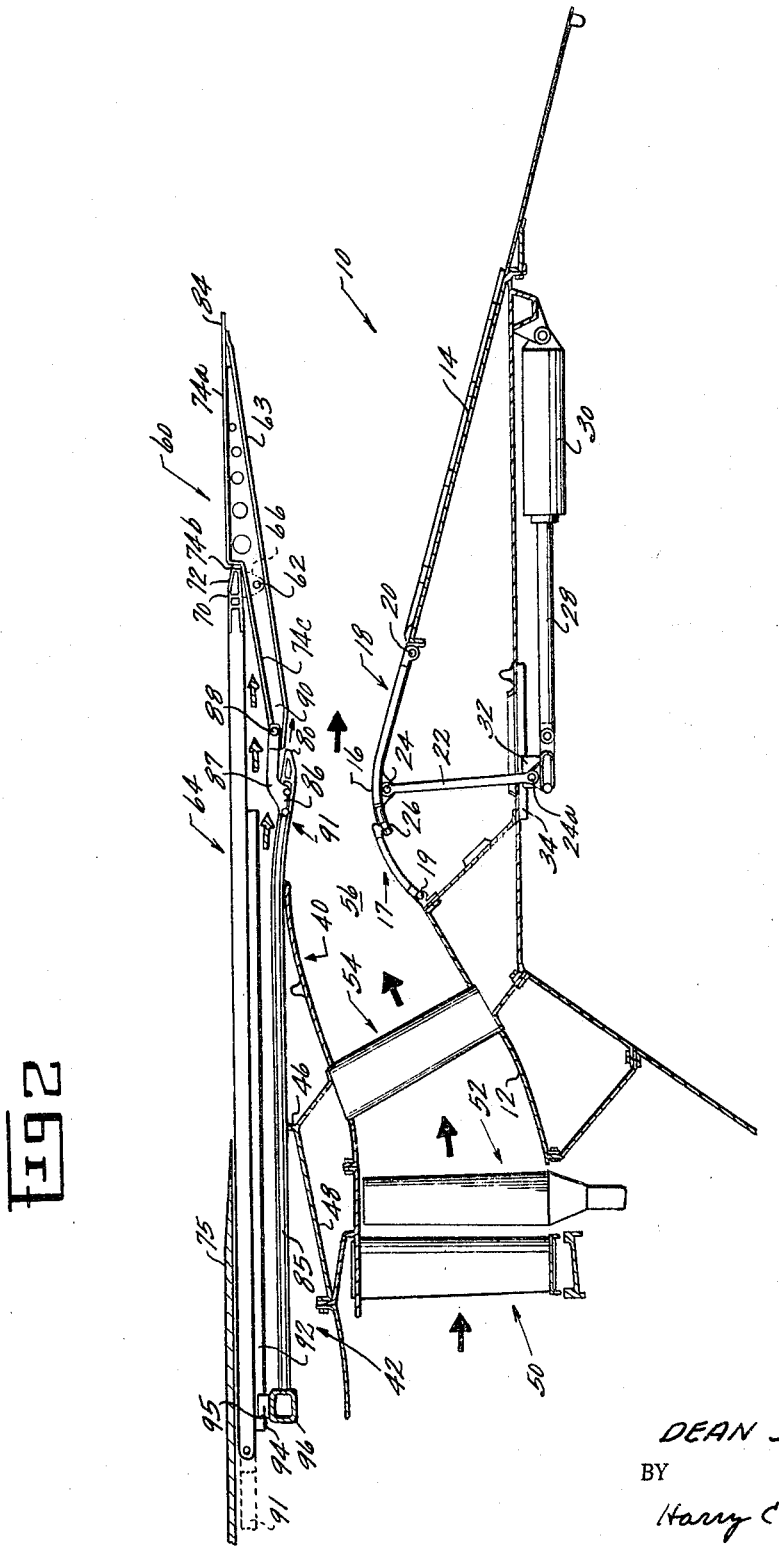
INVENTOR.
DEAN J. LENNARD
BY
Harry C. Burgess
ATTORNEY Dec. 6, 1966  D. J. LENNARD  3,289,946
ANNULAR CONVERGENT-DIVERGENT EXHAUST NOZZLE
Filed Aug. 7, 1963  3 Sheets-Sheet 3

INVENTOR.
DEAN J. LENNARD
BY
Harry C. Burgess
ATTORNEY

United States Patent Office 3,289,946
Patented Dec. 6, 1966

3,289,946
ANNULAR CONVERGENT-DIVERGENT
EXHAUST NOZZLE
Dean J. Lennard, Cincinnati, Ohio, assignor to General
Electric Company, a corporation of New York
Filed Aug. 7, 1963, Ser. No. 300,434
4 Claims. (Cl. 239—265.39)

The subject invention relates to an exhaust nozzle for a jet engine and, more particularly, to an annular convergent-divergent exhaust nozzle for use in high speed aircraft having an improved mechanism for converting from subsonic to supersonic flight operation while minimizing aerodynamic drag and maximizing nozzle performance.

More and more interest is being shown in improved powerplants for high Mach supersonic aircraft. These turbojet and turbofan engines, for example, have recently become the subject of intensive studies aimed at providing means whereby engine operating efficiency may be optimized under dissimilar flight conditions. These studies have included jet engine exhaust nozzle designs. Thus, it has been shown that for subsonic operation an efficient type of jet engine exhaust nozzle is one having a convergent shape and that for supersonic speeds a nozzle having a convergent portion followed by a divergent portion is more efficient. It is also desirable to permit variation of the throat (plane of sonic velocity) or convergent portion of such a nozzle as well as the nozzle exit area to maintain high performance under a wide range of operating conditions. One means for varying the nozzle throat and exit areas comprise pluralities of movable members or flaps pivotally supported about the nozzle axis. One of the problems associated with use of a plurality of flaps concentrically arranged about the engine axis has been the need for keeping the outer diameter of the nozzle within design limits. This is necessary for the reduction of aerodynamic drag caused by projection of the movable nozzle members and supporting structure into the flow stream around the nozzle. One means for simplifying the overall nozzle structure is to utilize the so-called "plug" nozzle concept wherein a generally conical centerbody or plug is supported centrally of the variable outer flaps. The tapering plug or spike forms a divergent expansion surface in the nozzle and can also be variable in diameter for throat area diameter changes.

In the subsonic and transonic operating positions of such nozzles there is, therefore, a desire to minimize "base area," base area being defined as the projected annular area of the extreme rearward part of the outer portion of the nozzle which causes flow separation and resultant aerodynamic drag. The base area typically has been large, however, since the mechanisms for varying the nozzle internal and external flow configuration have been relatively complex and have required a relatively large structural envelope. Another requirement is for minimum "boat-tail" angle, that is, the angle the outer convergent portion of the nozzle makes with the engine axis in the subsonic position. On the other hand, in the supersonic or high pressure ratio operating mode (pressure ratio being defined as the ratio of the pressure upstream of the throat or plane of sonic velocity in the nozzle to ambient pressure), exit area must be maximized for optimum performance. Further, there should ideally be little or no boat-tail angle in the outer portions of the nozzle, that is, the nozzle should be approximately cylindrical without any base area at supersonic flight speeds. There is also the constant need for minimum weight and reduction of the complexity of the system for nozzle area throat and exit variation.

Accordingly, it is the general object of the present invention to provide an improved lightweight, highly reliable mechanism for converting a nozzle having low boat-tail angle and low base drag in the subsonic and transonic operating modes into an annular convergent-divergent nozzle having optimum aerodyamic performance in the supersonic operating mode.

Briefly, one embodiment of my invention comprises an annular variable area convergent-divergent nozzle including an outer generally cylindrical supporting structure having a generally conical plug member located centrally thereof, the plug member tapering downstream from a point of maximum diameter at the nozzle throat area, a shroud member supported for relative axial movement on said support structure, and a plurality of flap members concentric to the plug member and pivotally attached to the shroud. The flaps have an outer surface which is so configured that the outer surface provides a low boat-tail angle in combination with the flap mounting structure, in the subsonic and transonic operating mode. The flap also provides a cylindrical outer surface during supersonic operation and an inner surface joining the outer surface at the downstream edge of the flap and diverging in an upstream direction from the outer surface so that in the supersonic operating mode the inner surface provides a divergent reflection or expansion surface in combination with the tapering portion of the plug member. A highly reliable, simplified mounting and actuation mechanism for the shroud is also provided which enables the flaps to translate and pivot between the subsonic and supersonic nozzle operating positions.

It is believed that other objects and many of the attendant advantages presented by this invention will become more apparent and better understood when the following detailed description is read in conjunction with the accompanying drawings in which:

FIG. 2 is a view of the nozzle of FIG. 1 in the supersonic operating mode;

Figure 1:
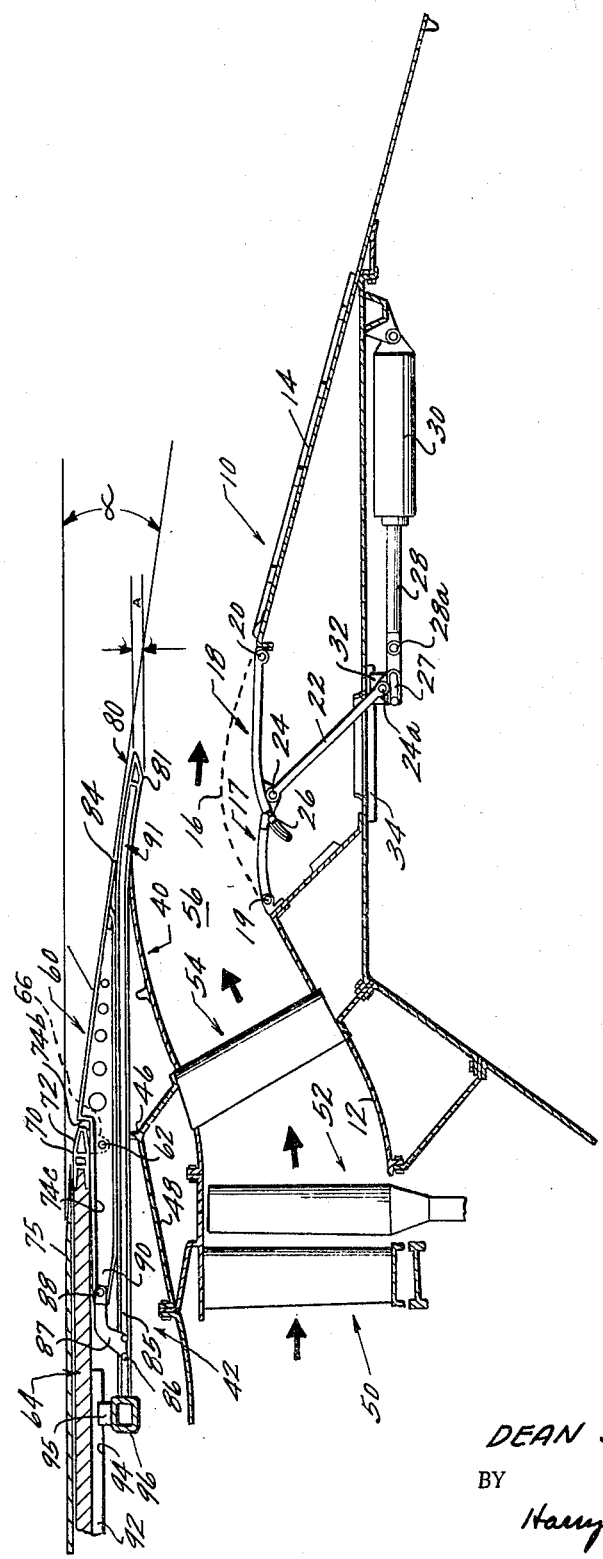
FIG. 1 is a partial cross-sectional view along the centerline of a jet engine nozzle and illustrating one embodiment of the invention wherein the nozzle is in the subsonic operating mode.

Referring now to FIG. 1, illustrated therein is one form of variable plug nozzle for the exhaust gases of a jet engine (not shown) and it will be understood that the invention can be equally utilized with other exhaust nozzles requiring variation in nozzle throat and exit area. In the drawing, indicated generally at 10 is a bulbous annular, generally conical plug member. The plug member shown herein comprises an upstream diverging portion 12 and a downstream elongated tapering portion 14. The plug member 10 has an area of maximum diameter at 16 which may be variable in extent by means of a plurality of hinged pivotable members, two of which are indicated generally at 17 and 18. As shown in FIG. 1 in solid lines, i.e., in the minimum area position, the members 17 and 18 are pivotally supported at 19 and 20, at their upstream and downstream ends, respectively, by the plug walls 12 and 14, also respectively. Movement of the members 17 and 18 about points 19 and 20 to accomplish plug diameter variation is provided by means of a link 22 pivotally attached at 24 to the upstream end of flap 18 which, in turn, is cammed to the downstream end of flap 17 at 26, the other end of the link 22 being pivotally attached to a unison ring 27 at 24a, which is in turn attached to an actuator rod 28 at 28a. The other end of the rod 28 is connected to an actuator 30. The actuator 30 moves the ring 27 which in turn is guided axially by means of a slider 32 mounted in a track 34. The outer portion of the nozzle embodiment shown comprises an inner wall member or shell indicated generally at 40 and an outer cylindrical support member indicated generally at 42. The outer member or support cylinder 42 includes a flange portion 46 mounted to a conical member 48 which also provides support for a stator or frame member, indicated generally at 50. Downstream of the stator 50 is a turbine, generally indicated at 52, of a known design. Helping to support the plug member 10 is a strut indicated generally at 54 extending at an angle transversely of the annular flow path 56 for the hot exhaust gases formed by walls 40 and 12 and indicated by the solid arrows in the drawing.

Turning now to a primary feature of this invention, indicated generally at 60 is one of a plurality of variable fingers which are operable as described hereinbelow to effectuate conversion of the nozzle from a low boat-tail subsonic and transonic operating position to a supersonic operating mode. As stated above, it is highly desirable to provide the lightest and most simplified, i.e., reliable means for changing the nozzle operating condition. Thus, the nozzle flaps shown in the drawings include a centrally located pivot point 62 adjacent the flap inner surface 63 by which the flaps are attached to an outer annular shroud member, indicated generally at 64 by means of a clevis 66. The clevis 66 is supported by ring 70 forming the downstream end of the annular shroud member. The outer surface of the flap 60 comprises a downstream portion 74a, a notched portion 74b, and an upstream or reduced portion 74c. In the subsonic operating position shown in FIG. 1, the shroud base ring 70 is adapted to fit into the notched portion 74b of the outer surface of the flap, with the angle of the outer surface 72 of the ring matching that of the portion 74a of the flap outer surface. Just upstream of ring 70 appears the downstream end 75 of the engine casing or nacelle. Thus, in the subsonic or transonic flight regime the outer surfaces at 75, 72 and 74a form a low boat-tail angle together with the downstream end 80 of the support structure 42. Note that ring 81 at the extreme downstream end of the structure 42, and which extends beyond the downstream end 84 of the flap 60, forms a small "base area" a, the portion 80 being angled to form a continuation of the boat-tail angle formed by the outer surface 74a of the flap.

The cylindrical structure 42 also provides means for moving the flap 60 axially of the nozzle, i.e., between a rearward or supersonic position and a forward or subsonic position. Thus, there is provided a slot or cam 85 in which rides a pair of sliders 86 mounted at one end of an angled bracket 87 pivotally attached at 88 to the upstream end 90 of the reduced portion of 74c of the flap 60. Thus, as shown in FIG. 2 wherein the shroud member 64 has been translated in the downstream direction, the sliders 86 have slid along the cam 85 until positioned in a downstream or curved portion of the cam indicated at 91. Since the bracket 87 is pivotally attached at 88 to the upstream end of the flap 60 which in turn is pivotally attached at 62 to the clevis 66, the flap will be pivoted outwardly about point 62 until the notched portion 74b of the flap 60 abuts ring 70, at which point surface 74a forms a continuation of the outer surface of the shroud 64. It will be noted that the downstream lip or edge 84 of the flap 60 comes to a sharp point which reduces or substantially eliminates the "base area" of the nozzle in the supersonic operating mode. The flaps are held in the outwardly pivoted position as shown in FIG. 2 partially by the pressure loading provided by a flow of cooling air, shown by the cross-hatched arrows in the drawing, pushing radially inward against the inner surface of the flaps and also by reason of the expansion in the divergent portion of the nozzle which forces the expanding air outwardly to pressure load the inner surface 63 of the flap and partially by the pivoting-locking-action of bracket 87.

It will be apparent that nozzle flap and supporting structure of the invention provides the minimum base area necessary for maximum aerodynamic performance and minimum drag, in addition to an optimum boat-tail angle which is also required for maximizing aerodynamic performance. Further, the single flap and actuation arrangement described also provides minimum exit area in the subsonic and transonic positions which is a requirement since the required nozzle expansion area is small in this mode of operation and unless matched to the pressure ratio, increased drag will result. On the other hand, at higher pressure ratios, i.e., higher speeds a maximum exit area is needed to match the expansion requirement in the divergent portion, also to reduce drag. The movable flap design of the invention also provides optimum expansion of the fluid flow in the supersonic position by reason of the inner nozzle surface 63 combining with the expansion surface 14 of the plug to produce an optimum angle of divergency within a minimum overall envelope at the end of the nozzle.

Figure 4:
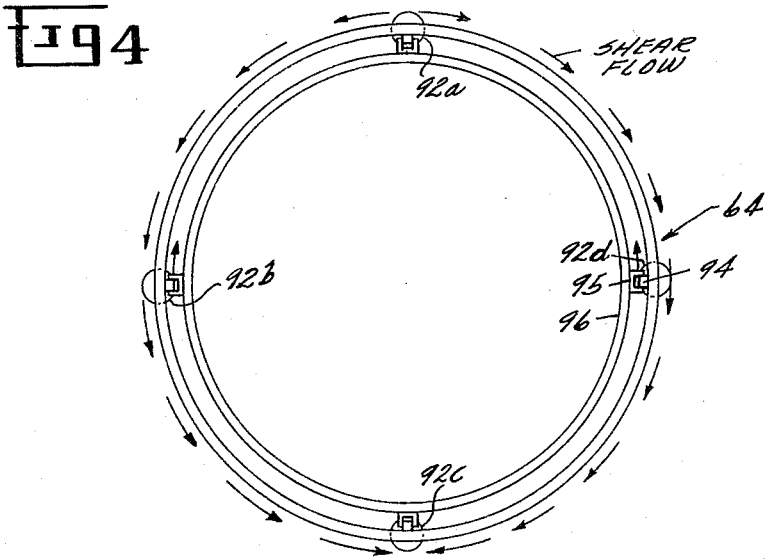
FIG. 4 is a view taken along lines 4—4 of FIG. 3.
Figure 3:
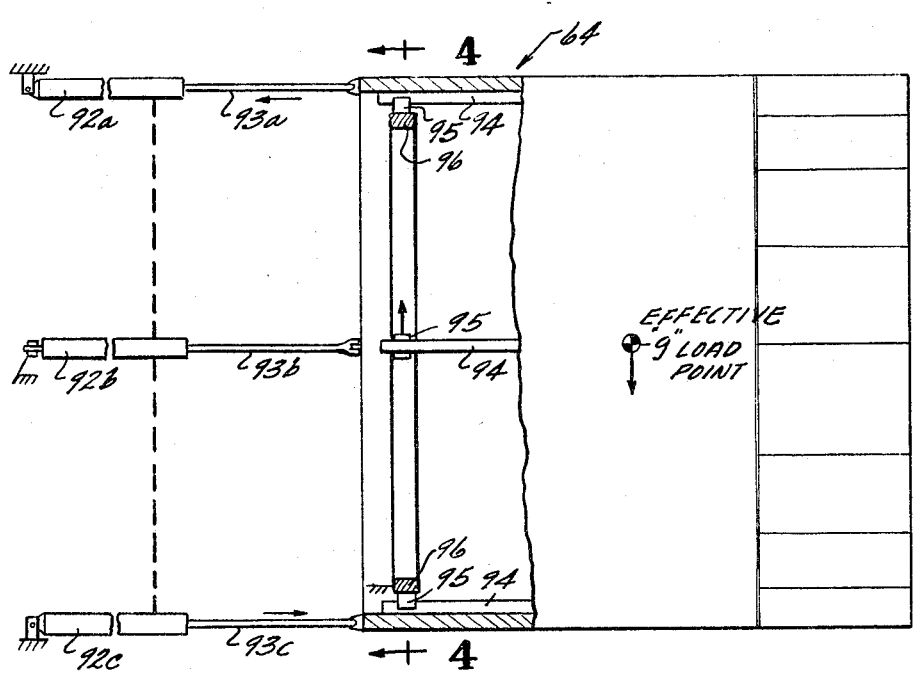
FIG. 3 is a schematic view of an improved actuation and mounting arrangement for the nozzle flap members of the embodiment of FIGS. 1 and 2.

FIGS. 3 and 4 illustrate means whereby the shroud 64 of the nozzle shown in FIGS. 1 and 2 may be translated axially by a simplified actuation and mounting arrangement which also serves to provide improved rigidity in the nozzle with minimum weight. The actuation system comprises four synchronized actuators, 92a, 92b, 92c and 92d. The actuators are rigidly mounted to the engine casing or nacelle. The actuators are operably connected to the shroud 64 by rods 93a–93d. Mounted on the interior surface of the shroud are tracks 94 which cooperate with followers or sliders 95 rigidly attached to a circumferential ring 96 which in turn is affixed to the support structure 42, as seen in FIG. 2. The system shown ensures proper operating alignment of the shroud and relative radial movement between shroud and ring 96 as a result of differential thermal expansion between the heated ring and the relatively cool shroud. This arrangement also supports the shroud 64 against aircraft maneuver or "g" loadings. The ring 96 being attached to the support structure acts to maintain the correct radial position of the shroud by resisting shear forces while the synchronized action of the actuators resists any overturning moment due to violent maneuvers of the aircraft.

Thus, as shown in FIG. 4, the mounting system provides only *one* shear mounting plane while permitting a minimum length and thus minimum weight shroud. Provision of the single shear plane eliminates the need for the conventional four point (in an axial plane) supporting means for the translating flap supporting structure usually comprising an elongated cylindrical member. Thus, the system of the present invention permits elimination of normally required downstream mounting points (i.e., the *second* mounting plane) which would be normally positioned to the left of the slider or ring attachments 95, as shown in FIG. 3. The result is that it is not required that an additional support means be provided and that synchronized actuators can be placed closer to the shroud so that there will be no interference with nor any requirement for additional support for the track 94. The mounting arrangement described thus permits use of the lighter weight shroud and flap supporting and translating mechanism of the invention.

Other embodiments of the subject as would be within the skill of the art are intended to be covered by the appended claims.

What is claimed is:
1. An annular convergent-divergent exhaust nozzle for an axial flow jet engine including:
   an outer generally cylindrical support structure having a downstream lip portion;

a generally conical plug member mounted centrally of said support structure having an area of maximum diameter upstream of a tapered portion, said area of maximum diameter cooperating with said lip portion to define the nozzle throat;

a shroud member mounted for relative axial movement with respect to said support structure;

a plurality of flap members having exterior and interior surfaces concentrically arranged about the plug member, said flaps being pivotally attached to said shroud;

and means for translating said shroud member axially of said support structure and pivoting said flap members including, a plurality of motor means operably connected to said shroud member, a ring member affixed to said support structure, track means affixed to said shroud member, slider means affixed to said ring and slidably engaged with said track means, said slider means providing a single shear resistant mounting plane for said shroud member, a curved cam slot fixed to said support structure, and cam follower means pivotally attached to the upstream end of said flaps and slidably engaged with said slot, said cam follower means causing said upstream flap member ends to pivot radially inward when said shroud is translated to the extreme downstream position to lock said flap members in position wherein said exterior surfaces form a relatively small boattail angle in combination with said lip portion in the subsonic and transonic nozzle operating positions and a cylindrical surface in combination with said shroud in the supersonic nozzle operating position to minimize aerodynamic drag and maximize nozzle performance, and wherein said interior surfaces in the supersonic nozzle operating position provide divergent expansion surfaces for the exhaust gases in cooperation with said tapered plug portion.

2. An annular convergent-divergent exhaust nozzle for an axial flow jet engine including:

an outer nacelle;

a generally cylindrical support structure within said nacelle;

a generally conical plug member mounted centrally of said support structure and cooperating therewith to define the nozzle throat and form a convergent portion of said nozzle;

a cylindrical shroud member mounted for relative axial movement on said support structure and defining an external boundary wall for said nozzle in combination with said nacelle;

a single set of flaps comprising a plurality of axially-extending members pivotally mounted intermediate the ends thereof on the downstream end of said shroud member, each of said flap members having forwardly divergent exterior and interior surfaces, whereby in a first position said exterior surfaces form a relatively low boattail angle for said nozzle in combination with a downstream portion of said support structure and in a second position said exterior surfaces form a generally cylindrical extension of said shroud member and said nacelle for minimizing aerodynamic drag; and means translating said shroud member axially to locate said set of flaps in either of said first and second positions.

3. An annular convergent-divergent exhaust nozzle for an axial flow jet engine including:

a generally cylindrical support structure having a downstream lip portion;

a generally conical plug member mounted centrally of and spaced from said support structure, said plug member having an area of maximum diameter upstream of its tapering portion, said area of maximum diameter cooperating with said support structure lip portion to define the nozzle throat;

an outer generally cylindrical shroud member mounted for relative axial movement with respect to said support structure, said shroud member partially defining an external boundary wall for said nozzle;

a single set of circumferentially-arranged longitudinally-extending flow defining wall members, said wall members being pivotally mounted at the downstream end of said shroud member, whereby in a first position said wall members cooperate with said downstream end of said shroud and said lip portion to form an external boundary wall continuation of said shroud, said continuation having a relatively low boattail angle, and in a second position said wall members cooperate with said shroud member to form a substantially continuous cylindrical external boundary wall for said nozzle for minimizing external aerodynamic drag, said wall members in said second position also forming an internal flow path boundary providing a divergent nozzle expansion surface for the jet engine exhaust gases.

4. An annular convergent-divergent exhaust nozzle for an axial flow jet engine including:

a generally cylindrical support structure having a downstream lip portion, said lip portion providing a minimum nozzle base area under subsonic jet engine operating conditions;

a generally conical plug member mounted centrally of said support structure, said plug member having an area of maximum diameter upstream of its tapering portion, said area of maximum diameter cooperating with said lip portion to define the nozzle throat;

a shroud member mounted for relative axial movement on said support structure, said shroud member partially defining an external boundary wall for said nozzle;

a single set of longitudinally-extending flap members arranged circumferentially about said plug member, said flap members being pivotally mounted intermediate the ends thereof at the downstream end of said shroud member, each of said flap members having an exterior surface and an interior surface fixed one with respect to the other and diverging in an upstream direction from the downstream end of the flap member, whereby when said flap members are in a downstream position said exterior surfaces form a cylindrical continuation of said external nozzle boundary wall for minimizing aerodynamic drag, and whereby when in an upstream position said exterior surfaces cooperate with said support member lip portion to form an external nozzle boundary wall of relatively low boattail angle, said interior surfaces in said downstream position cooperating with said plug tapering portion to provide a divergent flow path for exhaust gases in said nozzle; and combination actuation and mounting means for said shroud member operable to move said flap members between said upstream and downstream positions, said combination means comprising, a plurality of synchronized motor means operably connected to said shroud member and affixed to said support structure, a ring member affixed to said support structure downstream of said motor means, a plurality of sliders affixed to said ring, there being one slider for each of said motor means, and track means affixed to an interior surface of said shroud member, wherein said sliders provide a single radial mounting plane for said shroud and resist both shear forces and gravity loads impressed on the nozzle by gas loads acting on said flap members during operation of the engine in flight.

(References on following page)

References Cited by the Examiner

UNITED STATES PATENTS

| | | | |
|---|---|---|---|
| 2,641,104 | 6/1953 | Estabrook | 60—35.6 |
| 3,049,875 | 8/1962 | Horgan | 60—35.6 |
| 3,094,072 | 6/1963 | Parilla | 60—35.6 |

FOREIGN PATENTS 706,841  4/1954  Great Britain.

MARK NEWMAN, *Primary Examiner.*

RALPH D. BLAKSLEE, *Examiner.*